United States Patent [19]

Lenz

[11] 4,299,377

[45] Nov. 10, 1981

[54] MANUALLY OPERATED CLAMP EFFORT INTENSIFIER FOR VISE

[75] Inventor: John O. Lenz, Coon Rapids, Minn.

[73] Assignee: Kurt Manufacturing Company, Inc., Minneapolis, Minn.

[21] Appl. No.: 121,381

[22] Filed: Feb. 14, 1980

[51] Int. Cl.[3] .............................................. B23Q 3/02

[52] U.S. Cl. .................................... 269/136; 269/138; 269/221; 269/224; 269/236; 269/244

[58] Field of Search ............................... 269/134–138, 269/235, 236, 229, 224, 221, 240, 244

[56] References Cited

U.S. PATENT DOCUMENTS

| | | | |
|---|---|---|---|
| 63,929 | 4/1867 | Morse | 269/235 X |
| 1,406,901 | 2/1922 | Rocher | 269/235 X |
| 2,565,965 | 8/1951 | Hartmann | 269/235 X |
| 2,692,520 | 10/1954 | Hayes | 269/236 X |
| 2,818,786 | 1/1958 | Hammer | 269/135 X |
| 3,397,880 | 8/1968 | Kuban | 264/136 |
| 4,043,547 | 8/1977 | Glomb et al. | 269/136 |
| 4,098,500 | 7/1978 | Lenz | 269/136 |

FOREIGN PATENT DOCUMENTS

| | | | |
|---|---|---|---|
| 898313 | 4/1945 | France | 269/236 |
| 229474 | 10/1943 | Switzerland | 269/235 |

OTHER PUBLICATIONS

Kurt Manufacturing Company Catalog V-101, PAI-3-79, pp. 10-11.

*Primary Examiner*—Robert C. Watson
*Attorney, Agent, or Firm*—Kinney, Lange, Braddock, Westman and Fairbairn

[57] ABSTRACT

A clamp effort intensifier that multiplies the manual effort used for clamping vise jaws onto a workpiece through the use of a cam that actuates the vise jaws together to provide adequate clamping forces while substantially reducing the manual effort necessary to achieve a safe clamp force. The effort intensifier acts to load the vise jaw through a heavy spring which deflects as the jaws are loaded. The amount of deflection can be used to indicate the clamping force exerted on the jaws. An interlock to the machine tool used will prevent operation of the tool until the clamp force exceeds a desired level.

18 Claims, 9 Drawing Figures

MANUALLY OPERATED CLAMP EFFORT INTENSIFIER FOR VISE

BACKGROUND OF THE INVENTION

1. Field of the Invention

The present invention relates to clamp effort intensifiers for machine vises.

2. Prior Art

Machine vises of course have been quite well known in the prior art. For example, U.S. Pat. No. 3,397,880 shows a typical vise of the type disclosed herein, but without the clamp force intensifying device.

Additionally, U.S. Pat. No. 4,043,547 illustrates a machine vise having a movable jaw. The jaw has two parts. A belleville type spring washer is provided between the parts so that one of the parts of the movable jaw is kept from free movement under a small spring force even when there is no workpiece being clamped, but when a workpiece is clamped, the spring force is increased up to a relatively light load which holds the workpiece under a small clamping force. When large clamping forces are desired, the two portions of the movable jaw directly mechanically engage and the spring that is utilized is eliminated from the arrangement.

It should be noted that both of the above mentioned prior art patents show construction wherein the movable jaw will lock on a workpiece because the force from the nut that transmits motion to the movable jaw exerts the force of the movable jaw with a component that urges the jaw toward the ways supporting the movable jaw to clamp tightly. The same advantages can be incorporated with the vise of the present invention.

A further showing of a vise of the general type used herein is in U.S. Pat. No. 4,098,500.

SUMMARY OF THE INVENTION

The present invention relates to a jaw clamping force intensifier arrangement that greatly reduces the manual effort necessary to operate a vise. After the movable jaw is moved rapidly against a workpiece, and subsequently a lever is used to actuate a cam to act on the movable jaw and move it for final clamping under high mechanical advantage to securely lock the workpiece between the jaws. The force is applied through a nut that forces the movable jaw toward the ways supporting the movable jaw for positive locking of a workpiece.

The throw of the cam is fixed so a stiff spring is provided to absorb any excess cam travel to insure the cam will always go to a fully actuated position, at which position an overcenter lever will lock the cam in place.

The deflection of the spring can be sensed to directly determine the clamping force exerted. The means for sensing can be interlocked through controls to a machine tool with which the vise is used to prevent the tool from working if the vise is improperly clamped.

In the preferred form of the invention the spring is part of the nut which actuates the movable jaw.

In an alternate form, one end of the jaw screw is supported through a spring to the vise frame so that the thrust on the jaw loading screw caused by the effort intensifier will be reacted through the spring.

DESCRIPTION OF THE PREFERRED EMBODIMENT

Figure 1:
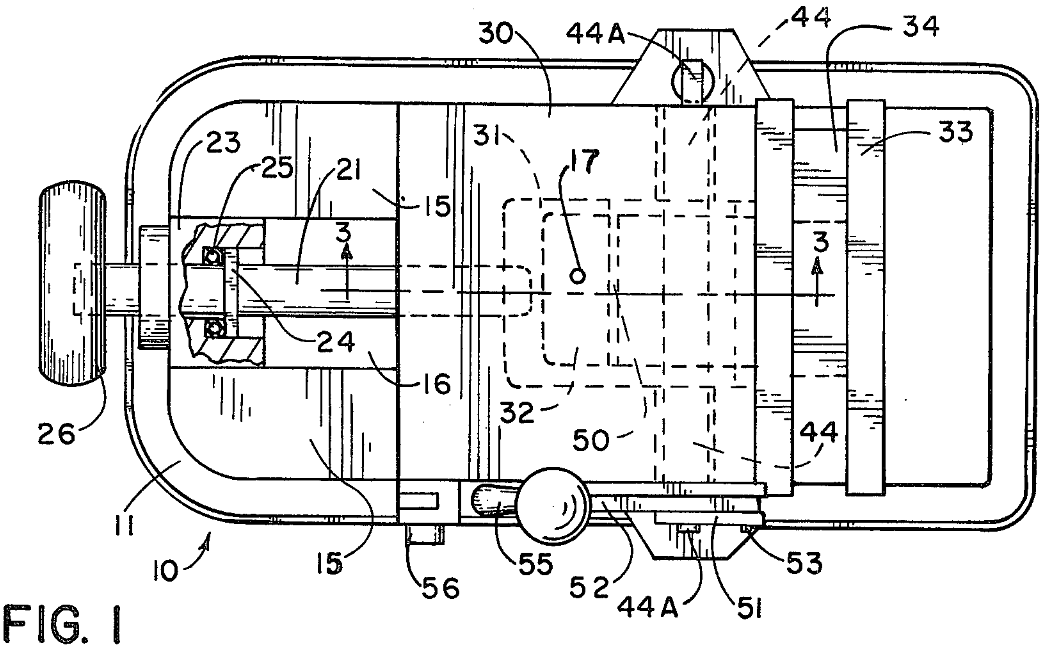
FIG. 1 is a top plan view of a vise including the clamp effort intensifier made according to the present invention.

A movable jaw vise indicated generally at 10 has a main frame or base 11 that is adapted to be mounted onto a support. The main frame 11 includes a base wall 13 and upwardly extending side wall members 14 that are attached to the base wall and form part of the main frame. The upper edges of the walls 14 have inwardly directed horizontal ways or rail members 15,15 which are spaced apart in the center of the vise as indicated at 16. The rail members 15 form overhanging ledges, the upper surfaces of which support a movable jaw shown at 30.

A movable jaw actuator nut 17 is mounted on the vise frame and has a threaded central opening indicated generally at 20 through which an actuating screw or jack screw 21 of suitable design is threadably mounted. The actuating screw 21 is rotatably mounted in a frame end member or mounting block 23 forming an upright end wall fixed to the side walls 14 of the main frame 11. The threaded screw 21 has a collar or washer 24 fastened thereto which bears against a thrust bearing 25 mounted in a suitable receptacle in the mounting block 23. The outer end of the screw 21 has a manual actuator thereon, and in the present invention all that is needed for an actuator is a rapid actuated control knob shown at 26 on the exterior of the vise that will permit an operator to rotate the screw 21 and thus move the nut 17 along the screw when the screw is rotated. It should be noted in FIG. 3 that screw 21 does not have to extend all the way along the length of the frame. The screw extends only partially into the nut 17 when the nut is in position where the jaws are closed or nearly closed.

The movable jaw 30 is constructed substantially the same as that shown in U.S. Pat. No. 3,397,880, as well as U.S. Pat. No. 4,098,500, and has an interior receptacle indicated generally at 31 that is on the bottomside of the movable jaw. The jaw 30 rides on the upper surface of the rails 15. Interior receptacle 31 receives an upright projecting boss portion 32 formed as part of the movable nut 17. This upper end portion of the nut 17 extends between the rails 15 through the slot or opening 16 so that it protrudes above the upper surface of the rails 15,15.

The vise also includes a stationary jaw 33 that is fixed to the main frame 11 in any suitable manner, and provides the normal reaction member for the clamping of a workpiece such as that shown at 34.

Figure 3:
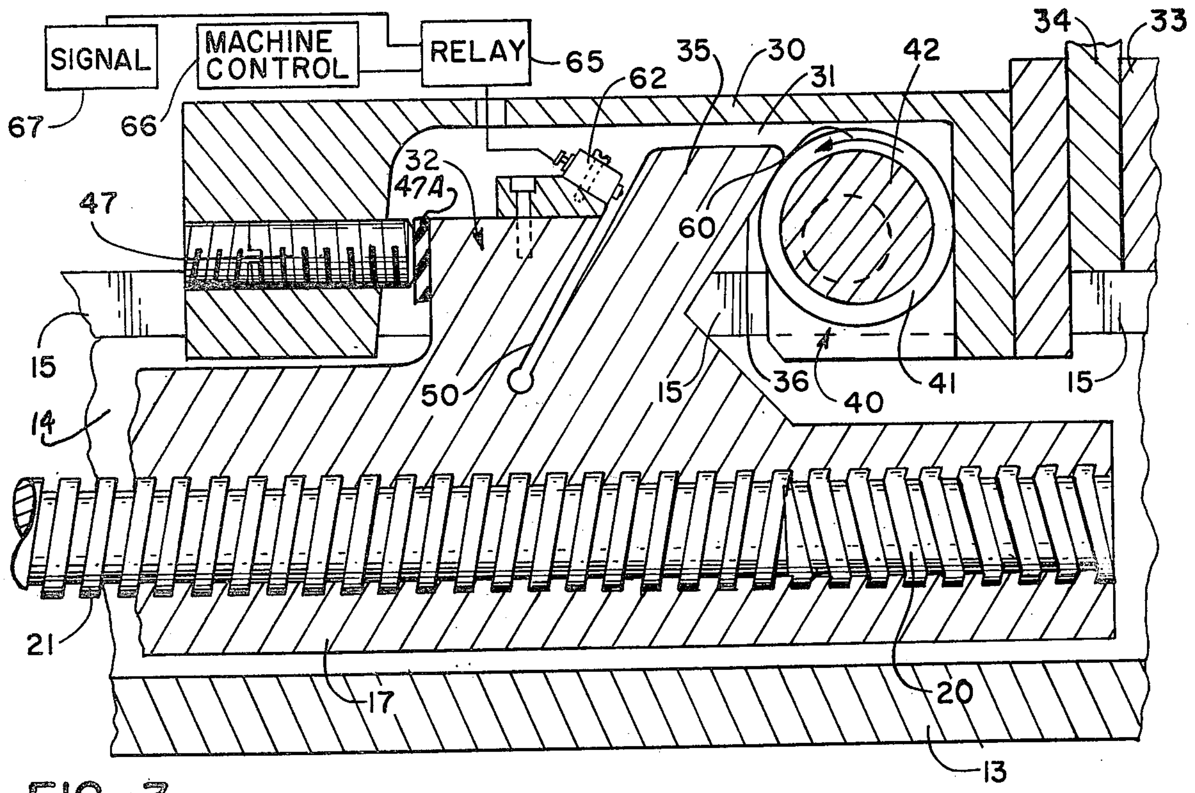
FIG. 3 is a sectional view taken as on line 3—3 in FIG. 1.
Figure 4:
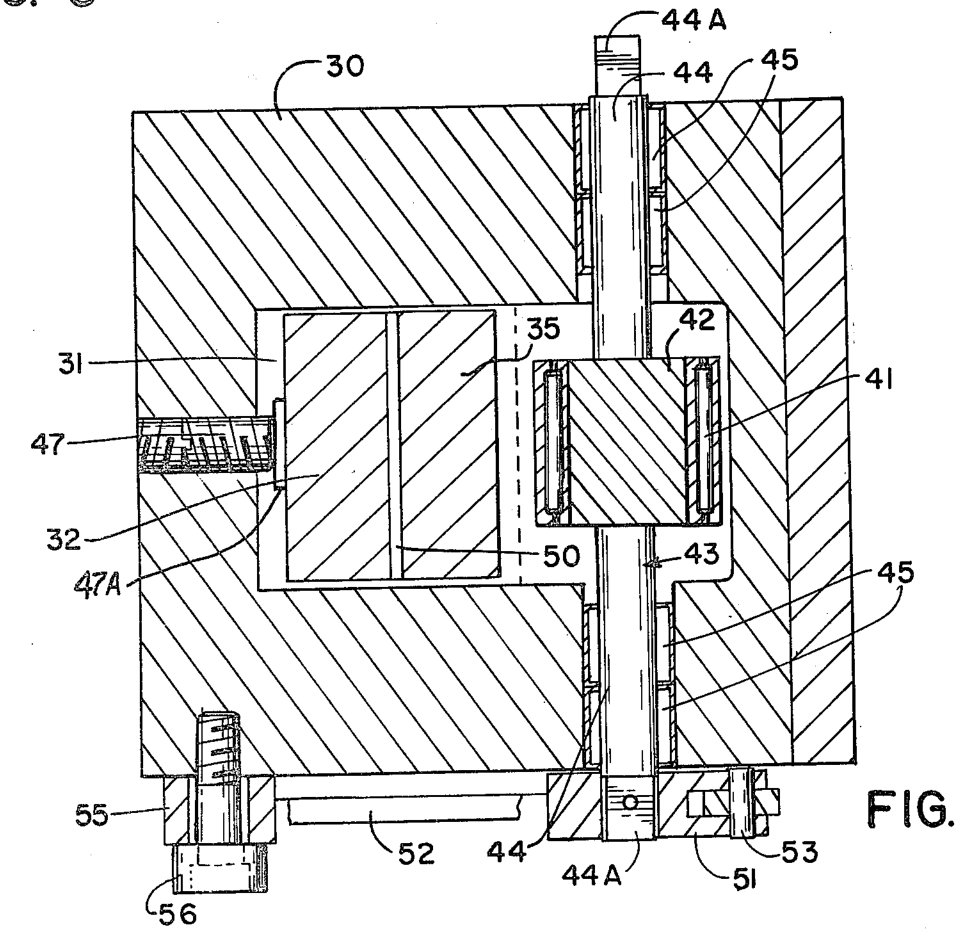
FIG. 4 is a sectional view taken as along line 4—4 in FIG. 2.

The boss member 32 of the nut 17 has a slit 50 therein which forms a heavy leaf spring member 35 that has a downwardly and rearwardly inclined surface 36 as shown in FIG. 3. The surface 36 of spring member 35 engages the movable jaw 31 as the nut is moved in direction to move jaw 30 toward the fixed jaw. The force from nut 17 is applied to the movable jaw 30 through a manual force multiplier, as shown a cam assembly indicated at 40 has a needle bearing cam roller 41 that is rotatably mounted onto an eccentric portion or actuator portion 42 of a cam shaft assembly 43. The shaft assembly 43 has outer end shaft portions 44 (FIG. 4) that are rotatably mounted in needle bearings 45 which in turn are mounted along the sides of the recess 31 of the movable jaw 30. The eccentric portion 42 of the cam shaft assembly 43, and thus the cam roller 41 is mounted in the recess 31 and positioned in relation to the boss 32 and spring member 35 so that as the nut 17 is threaded along the screw 21, the surface 36 of spring member 35 will engage the roller 41 and move the movable jaw 30 along with it. The cam roller 41 engages surface 36 at locations on the inclined surface 36 so that a component of force is exerted to urge the movable jaw down against the upper surfaces of rails or ways 15 as the movable jaw is moved against a workpiece. The movable jaw thus tends to lock down on workpieces.

A set screw 47 is threadably mounted in a threaded opening at the rear of the movable jaw 30 and the set screw is adjusted to engage a resilient block 47A on the back of boss 32. The set screw serves to retain the movable jaw on the projecting portion or boss 32 of the nut 17 when the nut 17 is moved along screw 21. The resilient block permits the movable jaw to move slightly in longitudinal direction as it compresses because when cam member 40 is operated there will be relative movement of the jaw and nut. The underside surfaces of side portions of the movable jaw 30 bear down upon the upper surface of the rails 15 in the same manner as that explained in U.S. Pat. No. 3,397,880 when the jaws are clamped.

In accordance with this invention, a high force can easily be transmitted from the nut to the movable jaw and to the workpiece by using the effort intensifier. Stated another way, the reaction force between the movable jaw and the frame of the vise (reacted through screw 21 and mounting block 23) is multiplied by use of the cam 40. A spring member such as 35 reacts the force from the main frame to the movable jaw and will yield to permit cam movement to a full high cam position. In order to form the member 35 as a spring which will yield, the slot 50 is cut into the upper end of boss portion 32. Thus the spring member 35 is cantilevered from the main portion of the nut 17 and forms a stiff leaf type spring. The nut 17 can be made of suitable material for use as a spring. The member 35 will thus resiliently bend when the clamp forces from the cam acting against the spring and tending to clamp a workpiece are sufficiently high.

Figure 2:
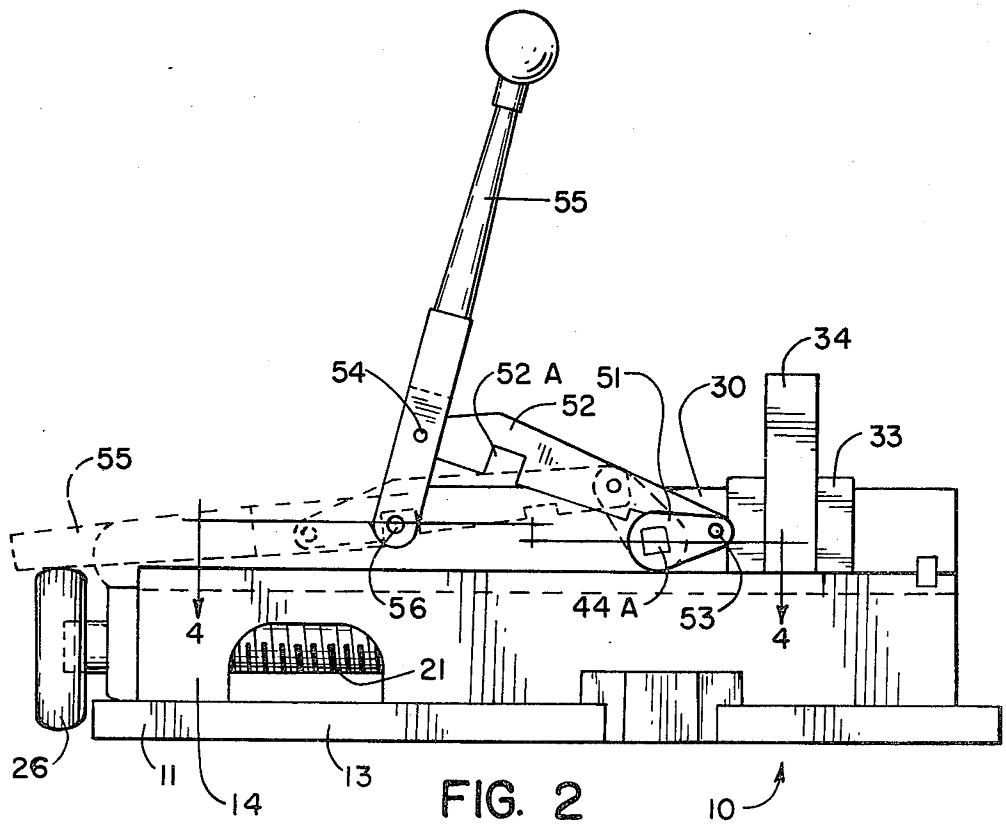
FIG. 2 is a side elevational view of the vise of FIG. 1.

The cam roller is actuated from a low cam to a high cam position through a lever on one of the squared ends 44A on the ends of the shaft portions 44. As can be seen in FIG. 2, one end 44A on the exterior of the movable jaw 30 has an arm 51 mounted thereon. A link 52 is mounted to arm 51 with a pivot pin 53. The link 52 is formed in a desired shape and is pivotally mounted with a pin 54 to a hand actuating lever 55. The hand actuating lever 55 in turn is rotatably mounted on a suitable pin or stud 56 also attached to the movable jaw 30. The lever 55 is made so that as it is actuated, the cam shaft rotates enough so that the center eccentric portion 42 moves from a released or low cam position when the lever 55 is in solid line position as shown in FIG. 2, to a high cam position. As the cam eccentric portion is moved, roller 42 rides against surface 36 and tends to cause the movable jaw 30 to move toward the fixed jaw 33 relative to the nut 17. The force from the cam movement is reacted by spring member 35. The amount of cam loading can be controlled by the amount of eccentricity of the cam shaft. A high clamping load can be exerted by a relatively small manual effort after the movable jaw is hand tightened with the control knob because the mechanical advantage of the cam and the actuating lever get very high as the cam moves near its high cam position. The cam rotational movement is in the direction as indicated by the arrow 60 in FIG. 3 and the actual offset or throw may be about 0.020 inches.

In operation after a workpiece has been placed between the fixed and movable jaws, the hand wheel 26 and screw 21 can be rotated to move nut 17 and the movable jaw 30 toward the fixed jaw until the movable jaw engages the workpiece 34 with hand tightening pressure. Then, the lever 55 is moved from its solid line position in FIG. 2 toward its dotted line position where the pivot points of link 52 would go over-center with the pivot of lever 55 to lock the cam in its high cam position. The force for clamping the workpiece increases as the cam moves and the force is reacted back through the spring member 35 to the nut 17, screw 21 and to the vise frame. The spring therefore permits cam movement to its locked position by yielding an amount determined by the spring rate of the spring member 35.

It should be noted that the notch 52A in the link 52 is used to clear the mounting pin 56 when the lever 55 goes to its over-center locked position.

As the spring member 35 of the nut 17 is loaded, it will deflect relative to the rest of the boss member 32, and tend to close the slot 50. The movement of the spring member 35 can be detected in a number of ways, including mechanical sensing (as with a dial indicator), small pressure sensors, or as shown in FIG. 3, a microswitch 62 can be utilized to sense this motion of spring member 35 so that when the spring member is deflected a desired amount it is known that the load exerted on the movable jaw 30 and the workpiece is above a minimum load.

The microswitch 62 is mounted onto the main portion of the boss 32 of the nut 17. The actuator of the microswitch can be positioned in a desired location, so that when the microswitch is actuated the spring member 35 will have deflected a known amount, and a minimum amount of force has then been applied to the workpiece and reacted back to the vise frame.

The microswitch can be used to operate a relay 65, and the relay can be used to "enable" the controls of a machine control 66 or to actuate a signal device 67 such as a warning light or the like. The machine control 66 is used to make sure that the machine tool with which the vise is to be used cannot be turned on until the clamping force on the workpiece 34 has exceeded a desired level so that it is certain that the workpiece is clamped with the necessary force to hold it for the operations that are to be performed. The signal 67, as stated, can be a light display to the operator indicating that the clamping force on the workpiece has exceeded a desired level which is indicated by the deflection of the spring member 35.

For releasing the workpiece, the hand lever 55 is moved to its solid line position shown in FIG. 2, which in turn rotates the arm 51 and the cam shaft assembly 40 so that the cam roller 42 releases the load on the workpiece 34. Then the hand screw can be backed off to permit the workpiece 34 to be removed as desired. It should be noted that the arm 51 and lever 55 can be moved to either side of the movable jaw 30 so that the actuator can be out of the way of other components on the machine tool being used.

Mechanical sensing of spring deflection can be utilized in place of the microswitch. A dial indicator mounted in place of the microswitch can be used. A suitable opening for the indicator can be left in the top of the movable jaw 30 so that the dial can be read. If a force sensor or pressure sensor is used in place of the microswitch, the readout can be directly in the pounds of force that are being exerted on the workpiece through the movable jaw and cam.

Figure 5:
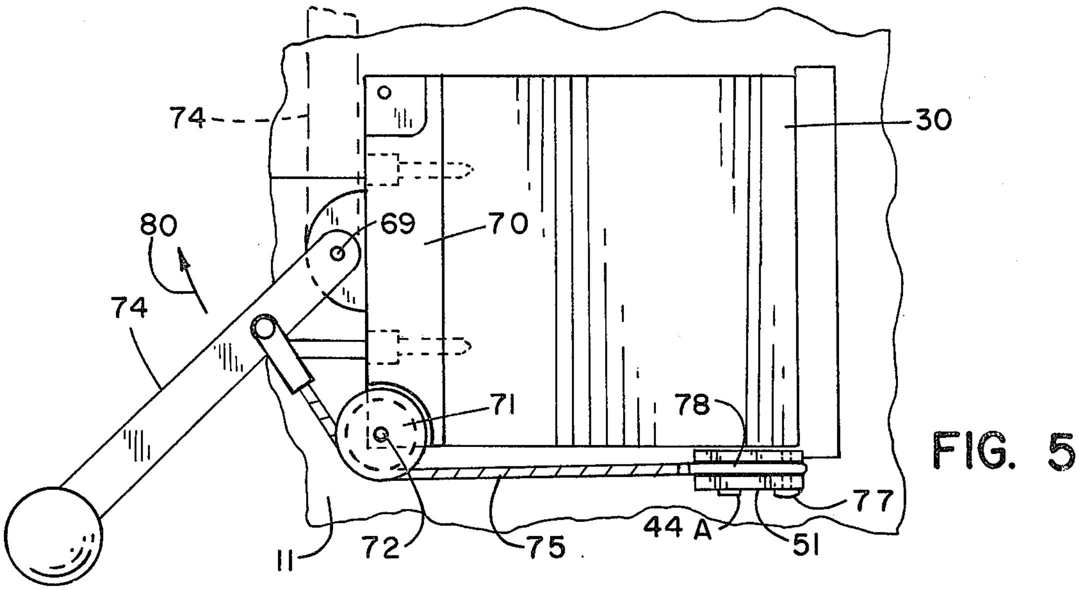
FIG. 5 is a schematic top plan view of a modified form of the invention to show a modified type of actuator lever.

In FIG. 5, a modified actuator arrangement is illustrated. The movable jaw 30 is constructed in exactly the same manner as before, except that the lever 55 and link 52 have been removed, as well as the pivot pin 56. An adapter end plate member 70 is mounted with suitable fasteners to the end of the movable jaw 30 opposite from the workpiece engaging portions. The adapter 70 has a pulley 71 rotatably mounted at one corner thereof on a suitable pin 72. Additionally, the adapter 70 has an ear 73 on which a manual lever 74 is mounted with a pin 69. The lever 74 pivots about an upright axis and thus extends generally horizontally. A control cable 75 is mounted to the lever with a suitable clip 76 which is mounted on a shoulder pin 79. The control cable passes around the pulley 71, and is mounted through an end eye 78 with a suitable pin 77 to the arm 51.

Actuating the arm 51 and the cam assembly 40 is done by moving lever 74 in direction as indicated by the arrow 80, which will cause the arm 51 to pivot in the same manner as previously explained, thereby actuating the cam shaft on which the arm 51 is mounted and reacting force from the movable jaw 30 to the nut 17 through the spring member 35. The lever 74 also is arranged so that it will lock in place by going overcenter as shown in dotted lines to hold the cam locked.

In this way the upright hand lever 55 is eliminated, and in certain instances where space requirements dictate, the horizontal lever can be used even though an upright lever could not be used.

It should be noted that a spring can be located anywhere along the reaction or force transmitting members between the movable jaw and the vise frame. A suitable adapter attached to a vise frame may be used to carry a spring which yields as the cam is actuated.

Figure 9:
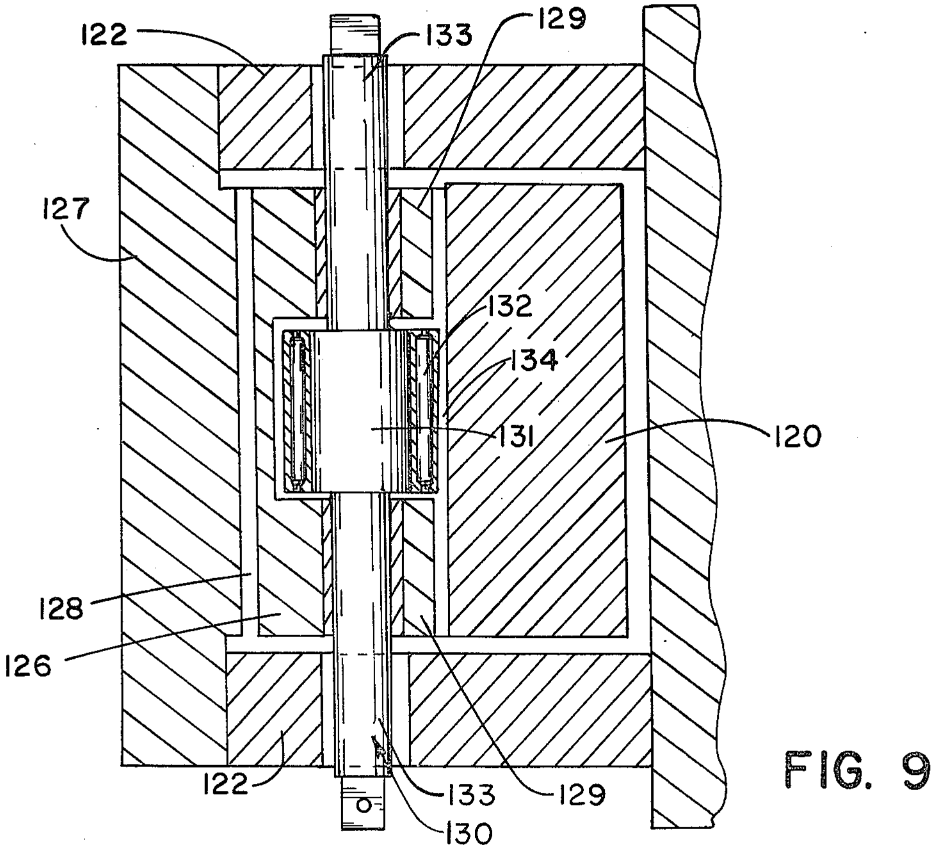
FIG. 9 is a sectional view taken as on line 9—9 in FIG. 8.
Figure 7:
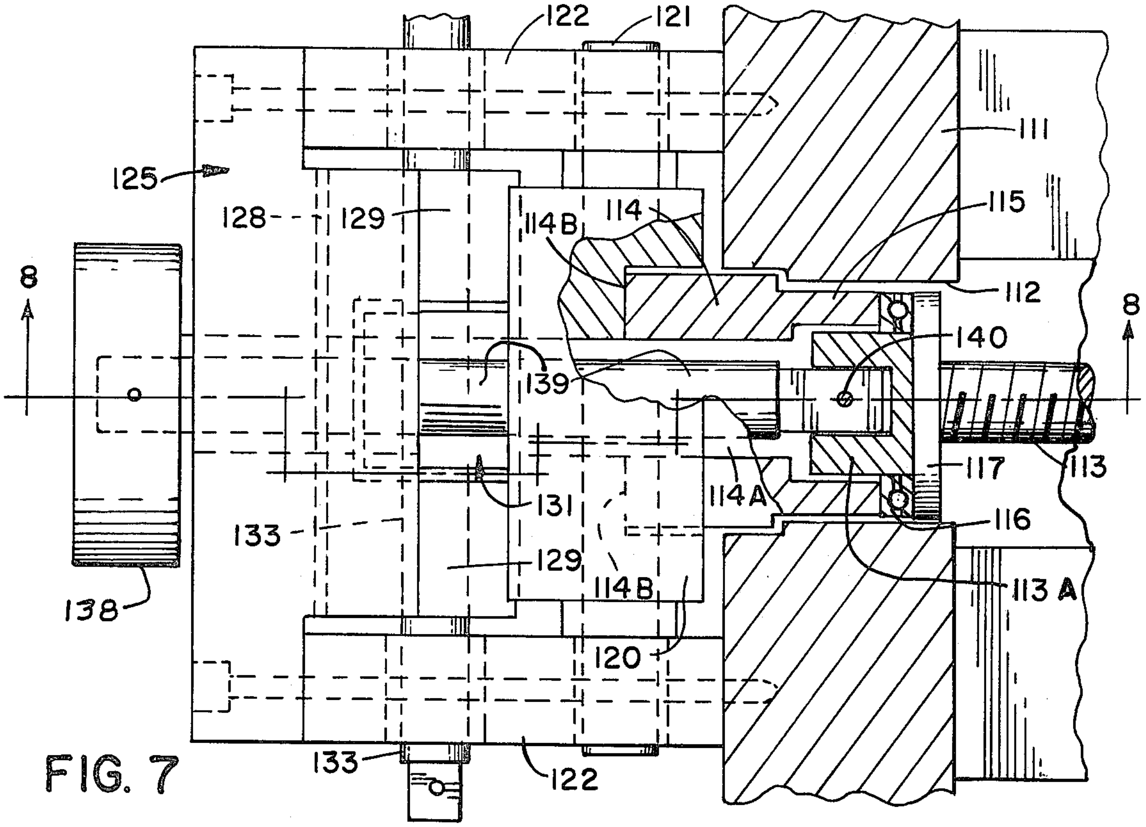
FIG. 7 is a top plan view of a further modified form of the invention showing the jaw loading screw and intensifier being reacted against a spring, with parts in section and parts broken away.
Figure 8:
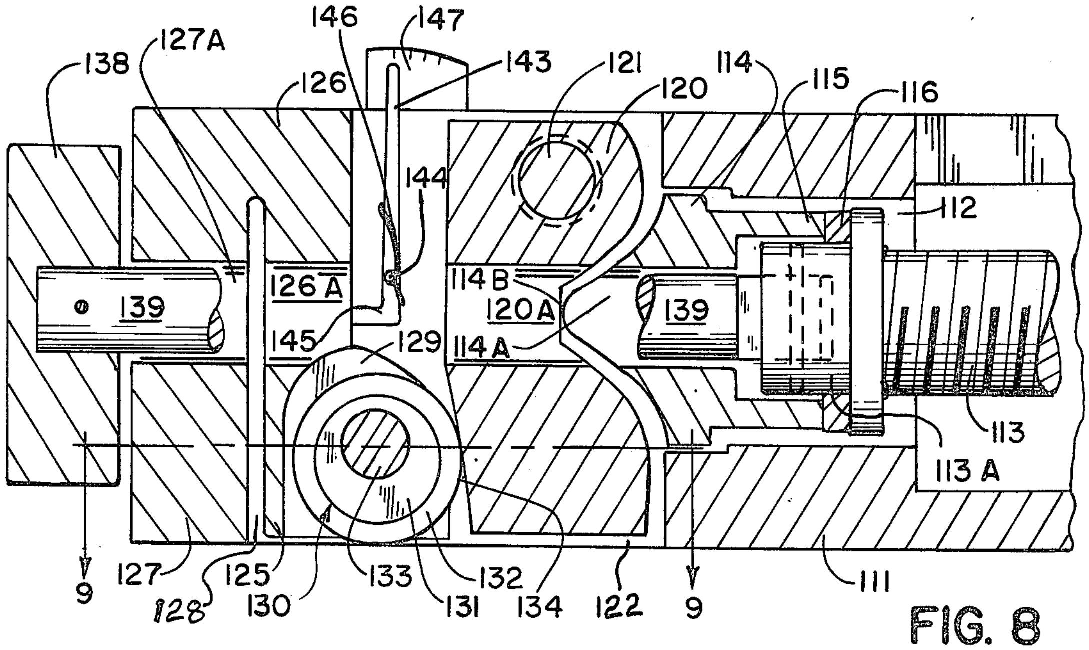
FIG. 8 is a sectional view taken as on line 8—8 in FIG. 7.

In a modified form of the mounting of the screw member shown in FIGS. 7, 8 and 9, only the back portion of a vise frame is shown, where the screw is supported on a vise frame cross member. The cross member 111 of a vise frame 110 has an opening 112 at its rear wall, and a jaw actuating screw 113 is used in the same manner as the screw 21 previously described. However, the end of the screw 113 has a coupling 113A carried in an interior opening of a housing or sleeve 114 that slidably mounts in opening 112 relative to the frame 111. The sleeve 114 is tubular. The housing or sleeve 114 has an annular hub 115 which surrounds the outer cylindrical surface of the end coupling member 113A of the screw 113, and an annular thrust bearing 116 is mounted between the end of hub 115 and a collar 117 that is fixed to the screw 113. The housing 114 will slide axially relative to the frame 111 a limited amount, and is controlled as to axial movement through a lever 120 which is mounted on a pivot pin 121 that in turn is connected between side plates 122 which are fixedly attached to the end of the vise frame 111. The lever has a receptacle mating with the outer end surface of the housing 114, so that upon pivoting of the lever a limited amount, the housing 114 will react the movement of the lever in axial direction of the screw 113. The hub 115, acting through thrust bearing 116 and washer 117 will impart such movement to the screw.

A spring plate assembly indicated at 125 is fastened to the outer ends of side plates 122 with suitable through bolts which also clamp the side plates 122 to the vise frame. The spring plate includes a cantilevered spring member 126. The spring member 126 is positioned between the end plate 127 and the lever 120. The lower end of the spring member 126 has a pair of spaced hubs 129 which receive and support end shafts 133 of a cam shaft assembly 130. The cam shaft assembly includes an eccentric center portion 131 which has a needle bearing cam roller 132 over the outer surface thereof and this bearing in turn engages the outer surface of the lower end of the lever 120. Upon rotation of the cam shaft 130 (in hubs 129), from a low cam position to a high cam position, the cam roller 132 engages the lever 120 at a line indicated at 134 and the lever 120 will bear against the housing 114 and transmit load to the screw 113. The shafts 133 are also mounted in needle bearings.

The screw 113 also is rotationally driven through a hand knob 138 on the outside of the end plate 127. The knob drives a shaft 139 which in turn is rotatably mounted in a provided opening in the end plate 127. The shaft 139 also passes through clearance hole 126A in the spring member 126 and in the lever 120 and passes through the center opening in the housing 114. The shaft 139 is drivably connected in the coupling member 113A at the end of the screw 113. The shaft 139 can be held in the coupling 113A of screw 113 with a suitable pin 140.

When the hand wheel 138 is rotated, the screw 113 will turn and will drive the nut 17 as shown in the first form of the invention, until the nut and the movable jaw 30 engage a workpiece. Then, upon rotation of the cam shaft 130 from its low cam to high cam position, the cam roller 132 will react against the lever 120 at location 134 on lever 120, and the cam and lever will exert a force through the contact lines 114B at the end housing 114 axially along the screw 113 through the collar 117. The manual effort on the lever will be multiplied by the cam. The spring member 126 deflects to accommodate the cam movement. The gap shown at 128 closes as spring member 126 deflects relative to the end plate 127. The clamping force is reacted to the vise frame through end plate 127 and side plates 122.

Figure 6:
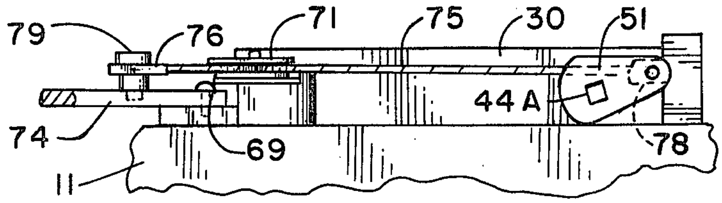
FIG. 6 is a side elevational view of the device of FIG. 5.

The cam shaft 130 can be actuated with a pivoting lever as in the previous forms of the invention or the shaft 130 also could be driven through a worm gear (which will lock and prevent reversing). The manual force is multiplied or intensified to securely hold a workpiece by actuating the cam. The amount of force applied can be indicated by sensing the deflection of the spring members 35 or 126. In the case of the form of the invention shown in FIGS. 6 and 7, the force is reacted directly to the vise frame, while in the first form of the invention, the forces are reacted to the vise frame through the screw and the nut.

Indication of load applied through spring 126 can be accomplished in the same manner as in the first form of the invention. However, a mechanical indicator is shown schematically in FIG. 8. An indicator finger or pointer 143 is pivoted on a pin 144 fixed to one end plate 122. The pointer 143 has an end portion 145 which bears against spring 126. A torsion spring 146 can be used for urging the end 145 against the spring 126. As spring 126 deflects the pointer will pivot and the outer end will swing in relation to an indicator plate 147 fixed to side plate 122. The movement of the outer end of the pointer is magnified by the location of the pivot. The position of the pointer end indicates the load on the workpiece.

The devices disclosed herein thus greatly reduce the manual effort required to operate the vise. The cam shaft used is completely mounted in low friction (needle) bearings, including the support shaft portions and the roller or eccentric portion. The actuating lever also is mounted in needle bearings.

The combination of the cam and lever provides an extremely low friction device with an almost infinite mechanical advantage over the last few thousands of movable jaw travel. With a conventional vise, the operator typically must expend approximately 100 ft. lbs of effort on the vise handle to get about 8,000 lbs. of clamping force between the jaws. With the present device, the operator has to expend only about 5 ft. lbs. of effort to generate the same clamping force between the jaws. The effort required to open the vise is correspondingly reduced.

The reaction spring was incorporated primarily to allow the operating handle to be fully locked in its overcenter position no matter how tightly the jaws were initially clamped on the workpiece. If the operator wishes to clamp the workpiece lightly so it will not "squash", the operator brings the movable jaw up to the workpiece with the vise screw knob very lightly and then moves the hand lever all the way. Most of the cam throw motion (0.020′) would be taken up by tightening the jaws on the workpiece, therefore the spring deflects very little and the resulting clamping force is low for example approximately 2,000 to 3,000 lbs. on a 6 inch vise. On the other hand, to clamp the work very tightly, the movable jaw is tightened against the work very tightly with the hand screw knob and again the hand cam lever is actuated. Much of the cam throw is then taken up by the spring and the resulting clamping pressure is typically approximately 8,000 lbs. on a 6 inch vise.

In each of the above examples the hand lever, such as lever 55 must be moved to its overcenter locked position so that the vise jaw cannot back off (loosen). Unless locked the low friction mounting of the cam and lever will cause the cam to reverse from the jaw force reaction and automatically open to prevent use of the vise until the workpiece is securely held.

Theoretically, if the movable jaw was tightened against the workpiece so tightly that no further motion of the movable jaw could occur, all of the cam travel caused by throwing the hand lever all the way over would have to be absorbed by the spring. The total clamping force resulting would then be equivalent to the maximum force the spring could exert when it is deflected the full amount of the cam throw.

The spring deflection is a built in indicator of load which, particularly where the spring is located on the nut provides an accurate, direct reading of load. The spring member on the nut pushes directly against the movable jaw through the cam and there are no linkages or other mechanisms to cause erroneous readings. Also, the back portion of boss 32 provides a convenient place to mount indicators on the microswitch.

The vise disclosed herein also can be rapidly actuated. The knobs on the screw for the nut can be rapidly turned until the workpiece is contacted and the cam control can be actuated with the other hand. The reduced manual effort required also speeds up operation.

The inclined surface 36 acting on the cam and movable jaw provides the downward force on the jaw for jaw tilt elimination and wear take-up on the movable jaw. The surface 36 is a cam follower surface. Further, the actuator cam is a mechanical advantage device giving high force multiplication, particularly in the last portions of the lever throw for low operator effort, fast operation and overcenter locking. The spring provides for reacting clamp force and provides means for indicating the clamp force and for interlocking machine controls or signalling devices. The actuating levers can be pivoted about a horizontal axis or a vertical axis.

What is claimed is:

1. A machine vise including a frame having jaw guide rail means, a fixed jaw mounted at one end of said frame, a movable jaw mounted on said rail means and movable toward and away from said fixed jaw, means for actuating said movable jaw toward and away from said fixed jaw comprising a vise actuator screw, a nut mounted for movement along said screw, means to operably couple said nut to said movable jaw comprising actuator means including a rotatable cam shaft having shaft portions rotatably mounted on said movable jaw and an eccentric cam roller means, said nut having a boss portion with a surface extending laterally relative to the rails and which engages the cam roller, and a manual actuator to rotate said cam roller to react against the surface to shift the movable jaw relative to the surface in direction toward the fixed jaw.

2. The vise of claim 1 including a lever mechanically movable to rotate said cam shaft.

3. The vise of claim 1 wherein said surface inclines in a direction tending to urge the movable jaw against the rail means as the movable jaw moves toward the fixed jaw.

4. The vise as specified in claim 1 and reaction spring means formed on the nut having a first end portion which deflects under loading from said cam roller, said spring means having a second end portion mounted on said nut.

5. The vise of claim 4 wherein said spring means is a leaf spring, said surface comprising a surface of said leaf spring.

6. The combination as specified in claim 4 and indicator means mounted relative to said frame in position to be responsive to the deflection of said spring means.

7. The combination as specified in claim 6 and means responsive to the said indicator means to provide a control signal for remote equipment.

8. The combination as specified in claim 6 wherein said indicator means provides a visual indication when the spring is deflected a desired amount indicating that a desired minimum amount of force is being exerted tending to move the movable jaw toward the fixed jaw.

9. A machine vise including a frame having a base and longitudinally extending rails having way surfaces, a fixed jaw mounted on said frame at one end thereof and extending above said rails, a movable jaw slidably mounted on said rails cooperating with said fixed jaw to permit clamping a workpiece therebetween, a jaw actuating screw rotatably mounted on said frame and extending generally parallel to the direction of movement of said movable jaw toward and away from said fixed jaw, a nut member threadably mounted on said screw and positioned between said rails, said movable jaw having a recess on its underside, said nut member having a rigid lug extending upwardly between said rails into the recess in said movable jaw, said rigid lug having a slit therein whereby a portion of said nut forms a cantilevered spring member having a surface, cam means mounted on said movable jaw within said recess to engage and react against the surface of said spring member whereby as said nut is moved along said screw the surface of said spring engages said cam means mounted on said movable jaw to move the movable jaw toward said fixed jaw, said spring member of said nut transmitting all of the force from said movable jaw back to said frame when a workpiece is clamped between said jaws.

10. The combination as specified in claim 9 wherein said cam means mounted on the movable jaw engaging said spring member comprises a cam member operable from a low cam to a high cam position to permit increasing the force with which the movable jaw engages a workpiece between said jaws after the nut has been moved along said screw to a position wherein the workpiece is initially engaged by the movable jaw, a lever pivoted on the movable jaw, and linkage means between said lever and said cam, said linkage means including an overcenter lock to hold the cam in its high cam position against forces on the cam tending to release the cam.

11. The combination as specified in claim 9 and means mounted on portions of said nut relative to which the spring member deflects to indicate when the spring member on said nut has deflected a desired amount.

12. The combination as specified in claim 10 wherein said cam member comprises a cross shaft extending transversely to the longitudinal axis of said screw, said cross shaft having a central portion and having end portions rotatably mounted on said movable jaw, said central portion being eccentric with respect to said end portions, said eccentric portion protruding into the recess of said movable jaw, and a roller mounted on said eccentric portion and engaging the surface of the spring member, said spring surface of said member being oriented at an angle with respect to the plane of said rail means to exert a force through said cam means that tends to move said movable jaw downwardly against said rail means at the same time it moves said movable jaw toward said fixed jaw.

13. A machine vise including a frame, a fixed jaw mounted at one end of said frame, a movable jaw mounted on said frame and movable toward and away from said fixed jaw, means for actuating said movable jaw toward and away from said fixed jaw comprising a vise actuator screw, means for operably coupling said actuator screw to said movable jaw comprising actuator means including a cam shaft rotatably mounted on said movable jaw and having an eccentric cam roller means, a leaf spring having one end mounted to react loads back to said screw and a deflectable portion having a surface, said cam roller means engaging said surface, actuator means for rotating said cam shaft to tend to shift the movable jaw toward or away from the fixed jaw relative to the surface as the cam roller engages the surface.

14. The machine vise of claim 13 wherein said cam shaft has end portions that are rotatably mounted on said movable jaw, said cam roller means being mounted between said end portions comprising a cylindrical member having a central axis offset from the central axis of said end portions, and needle bearing means mounted on said cylindrical portion to form said cam roller means.

15. The machine vise of claim 13 wherein said means for operably coupling the actuator screw to said movable jaw includes a nut member threadably mounted for movement along said actuator screw, said leaf spring having its one end mounted to a portion of the nut member.

16. A machine vise including a frame having a base, a fixed jaw mounted on said frame at one end thereof, a movable jaw movable on the frame and cooperating with said fixed jaw to permit clamping a workpiece, a jaw actuating screw having means coupling it to the movable jaw and being threadably operable to move said movable jaw toward and away from said fixed jaw, said means coupling including means forming a spring, a cam shaft rotatably mounted relative to the movable jaw, said cam shaft having an eccentric portion and being mounted so that upon rotation of the cam shaft the movable jaw is moved toward the fixed jaw relative to the spring and said spring reacts clamping forces back to said jaw actuating screw.

17. The vise as claimed in claim 16 wherein said spring means comprises a leaf spring having a first end portion which deflects under loading from said eccentric portion of said cam shaft, and needle type bearing means mounted on said eccentric portion to provide a low friction coupling between said leaf spring and said eccentric portion.

18. A machine vise including a frame having jaw rail means, a fixed jaw mounted at one end of said frame, a movable jaw mounted on said rail means and movable toward and away from said fixed jaw, means for actuating said movable jaw toward and away from said fixed jaw comprising a vise actuator screw, a nut mounted for movement along said screw, said nut being operably coupled to said movable jaw, a spring member mounted on the vise adjacent one end of the frame in position to react forces on the spring back to the frame, means mounted between said spring member and said screw comprising a collar fixed to said screw, a housing movably mounted relative to said frame and engaging said collar and being acted on by said spring to react forces on the screw back to the frame, a manual actuator operable to tend to move the movable jaw toward the fixed jaw under substantial mechanical advantage, said manual actuator being movable to a loaded position to increase the force exerted through said spring member by said jaws on a workpiece.

* * * * *